United States Patent [19]

Favaron

[11] Patent Number: 5,400,556
[45] Date of Patent: Mar. 28, 1995

[54] MODULAR STEP SYSTEM AND METHOD FOR MANUFACTURE

[75] Inventor: James Favaron, Clifton Park, N.Y.
[73] Assignee: Pacific Industries, Inc., Latham, N.Y.
[21] Appl. No.: 899,354
[22] Filed: Jun. 16, 1992
[51] Int. Cl.⁶ .......................................... E04F 11/00
[52] U.S. Cl. ................................... 52/182; 182/228; 52/8
[58] Field of Search ........... 52/169.7, 746, 8, 182–191; 182/228

[56] References Cited

U.S. PATENT DOCUMENTS

| | | | |
|---|---|---|---|
| 1,092,572 | 4/1914 | Hartmann | 52/182 |
| 4,343,120 | 8/1982 | Witte | 52/184 |
| 4,631,874 | 12/1986 | Griffin, Jr. | 52/8 |
| 5,010,699 | 4/1991 | Maiuccoro et al. | 52/169.8 |

Primary Examiner—James L. Ridgill, Jr.
Attorney, Agent, or Firm—Steinberg, Raskin & Davidson

[57] ABSTRACT

A step system for swimming pools comprises a unitary stair module including a stair shell formed of plastic sheet material and a plurality of elongated rigidizing members which are encapsulated within the plastic sheet material of the stair shell, and support braces for supporting the unitary stair module. A method of manufacturing the unitary stair module of the step system is disclosed and comprises encapsulating each of the rigidizing members in the plastic sheet material of the stair shell by vacuum forming.

25 Claims, 8 Drawing Sheets

MODULAR STEP SYSTEM AND METHOD FOR MANUFACTURE

BACKGROUND OF THE INVENTION

This invention relates generally to step systems, and more particularly to modular step systems for swimming pools and methods for manufacturing the same.

Prefabricated stair modules which are carried to the site at which swimming pools are in the process of installation are known. Stair modules formed of acrylic/fiberglass laminates or vinyl covered metal are relatively strong and will support a person's weight without much flexure. However, such stair modules may delaminate, splinter, corrode or puncture. Unitary stair modules comprising shells formed of suitable plastic compositions that can withstand temperature related expansion and contraction are also known. However, such materials are generally relatively flexible so that their steps may yield under a person's weight, giving that person an insecure feeling.

Attempts have been made to reinforce the steps of such prefabricated plastic shell stair modules to make them more rigid. For example, the treads of the steps have been supported by stacks of concrete blocks. However, this requires building the support from the ground up and, therefore, requires shimming to insure proper levelling. U.S. Pat. No. 4,589,237 discloses the use of support posts having bearing plates or pads connected to their upper ends which are placed against the underside of a step tread to support the step from beneath. U.S. Pat. No. 4,873,802 discloses adhesively bonding a narrow longitudinal stiffening member to the underside of a stair tread, and using vertical support posts that engage the stiffening member to support the step.

Although such prior art stair modules and support systems are relatively easy to install and ship to the pool installation site, they have definite disadvantages. For example, the adhesive bonding of the stiffening member to the underside of the step is labor intensive, and therefore is expensive and time consuming, and the stiffening member may separate from the stair tread. The vertical support posts do not provide sufficient support and the stiffening member is not sufficiently wide to adequately eliminate the flexing of the stair tread.

SUMMARY OF THE INVENTION

It is an object of the present invention to provide new and improved modular step systems for swimming pools and the like and methods for manufacturing the same.

Another object of the invention is to provide new and improved modular step systems for swimming pools including unitary plastic stair modules and methods for manufacturing the same.

Still another object of the invention is to provide new and improved modular step systems for swimming pools including one piece plastic stair modules having rigidized steps, and methods for manufacturing the same.

Yet another object of the invention is to provide new and improved unitary plastic stair modules for swimming pools and the like.

A further object of the present invention is to provide new and improved methods for manufacturing unitary plastic stair modules for swimming pools and the like which are inexpensive, labor non-intensive, and which produce plastic stair modules that have good performance characteristics.

Briefly, in accordance with the present invention, these and other objects are attained by providing a step system comprising a unitary stair module including a stair shell formed of plastic sheet material defining a plurality of step treads, and a plurality of elongated rigidizing members, each of which is at least partially encapsulated within the plastic sheet material of a respective one of the stair treads. Each rigidizing member preferably comprises a channel member having a web portion having a transverse dimension which is substantially coextensive with the transverse dimension of the step tread and which is encapsulated within the plastic sheet material thereof. The step system includes means for supporting the stair shell, preferably comprising at least two unitary support braces that are longitudinally spaced from each other. Each support brace has a base and a plurality of step support members that engage and support the underside of respective steps of the stair module.

According to the method of the invention, a unitary plastic stair module is manufactured by providing a plurality of elongated rigidizing members, and at least partially encapsulating each of them within the plastic sheet material of respective ones of the step treads of a stair shell formed of the plastic sheet material. The encapsulating step is accomplished by inserting the rigidizing members in cavities of a vacuum form mold and then vacuum forming a unitary piece of plastic sheet material in the mold to form the stair shell while at least partially encapsulating each of the rigidizing members within the plastic sheet material of respective ones of the step treads thereof.

The web of each of the rigidizing members preferably has a pattern of alternating raised and lowered surfaces, or ridges and valleys, formed in its substantially planar upper surface and the vacuum forming process is conducted such that the plastic sheet material of the corresponding step tread in which the web is encapsulated will follow the path of the ridges and valleys to thereby define a non-slip surface for the step tread.

DETAILED DESCRIPTION OF THE DRAWINGS

A more complete appreciation of the present invention and many of the attendant advantages thereof will be readily understood by reference to the following detailed description when considered in connection with the accompanying drawings in which.

DESCRIPTION OF THE PREFERRED EMBODIMENTS

Figure 1:
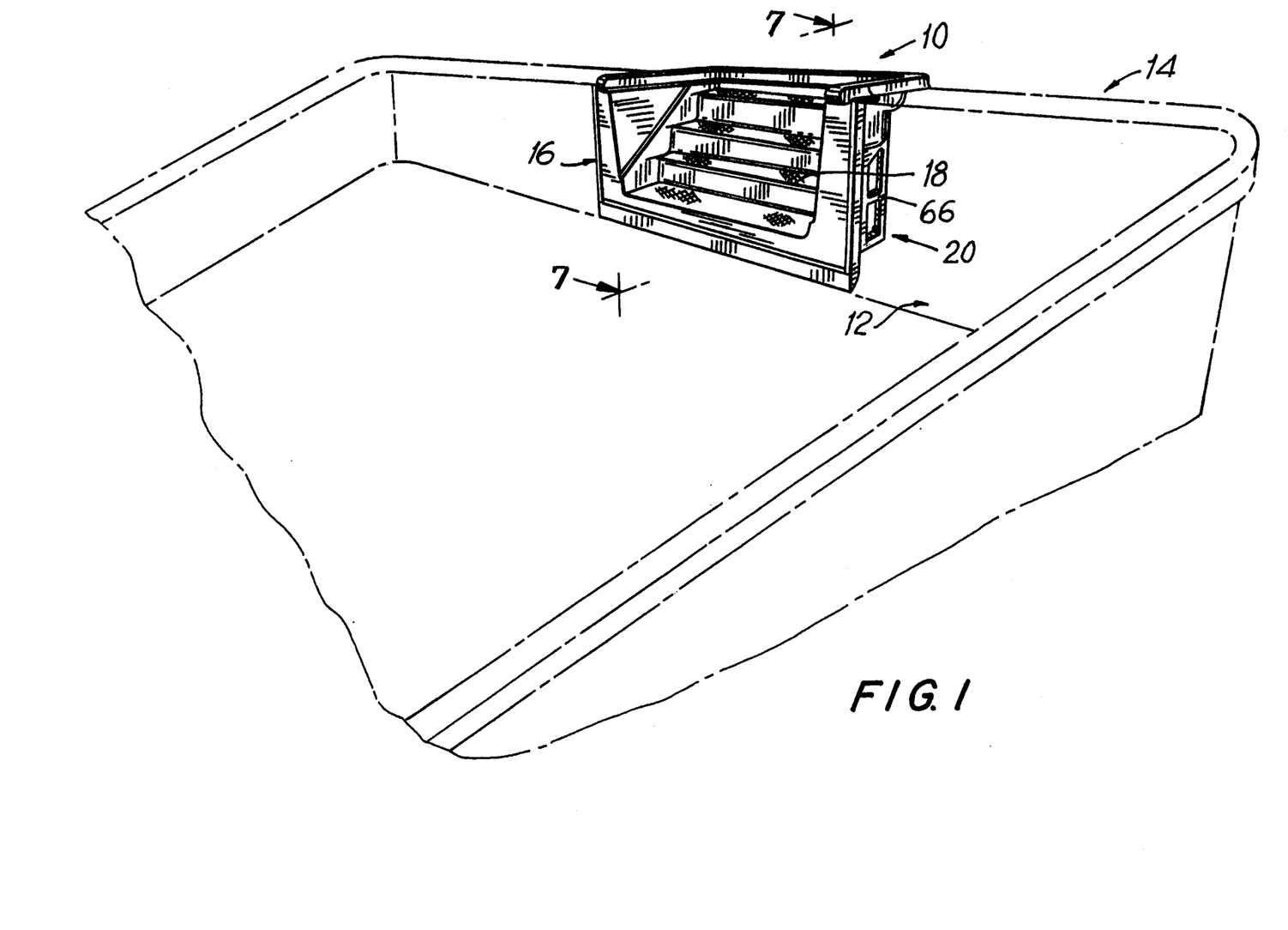
FIG. 1 is a perspective view of a step system in accordance with the invention shown in relationship to a swimming pool wall in which it is installed.

Referring now to the drawings wherein like reference characters designate identical or corresponding parts throughout the several views, and more particularly to FIG. 1, a step system according to the invention, generally designated 10, is illustrated installed in a space provided in the wall 12 of a swimming pool 14. The step system 10 includes a unitary stair module 16 defining a plurality of longitudinal steps 18, and support means 20 for supporting the stair module at an underside of the steps 18.

Figure 7:
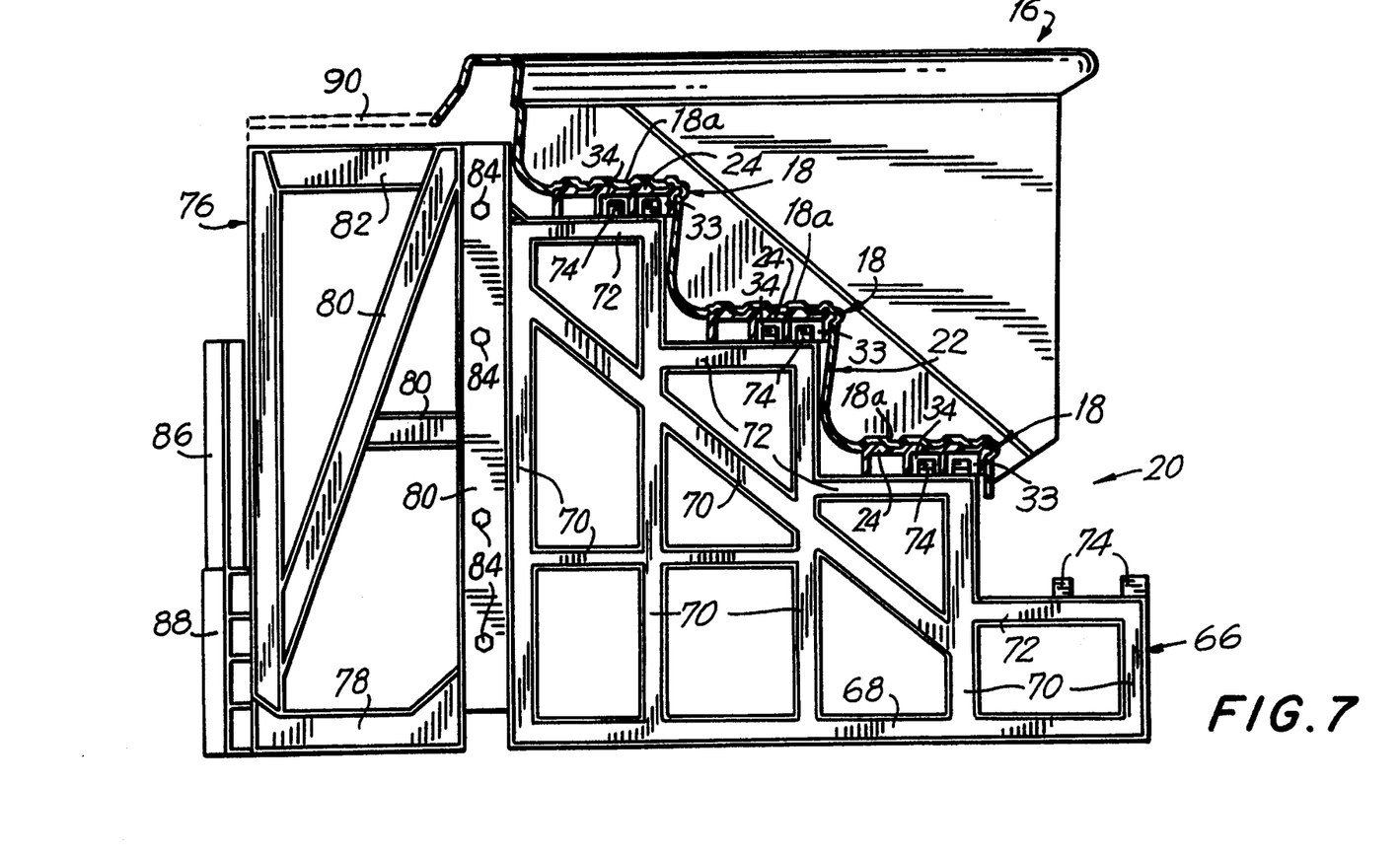
FIG. 7 is a partial side elevation view taken in section along line 7—7 of FIG. 1 and illustrating a completed unitary stair module and support means, together comprising a step system in accordance with the invention.

As best seen in FIG. 7, the stair module 16 comprises a stair shell 22 formed of plastic sheet material defining a plurality of step treads 18a, and a plurality of elongated rigidizing members 24 which are at least partially encapsulated within the plastic material of respective stair treads 18a. The stair shell 22 is formed of plastic sheet material, preferably a co-extruded sheet consisting of a cap of weatherable grade ASA over an ABS substrate.

Figure 2:
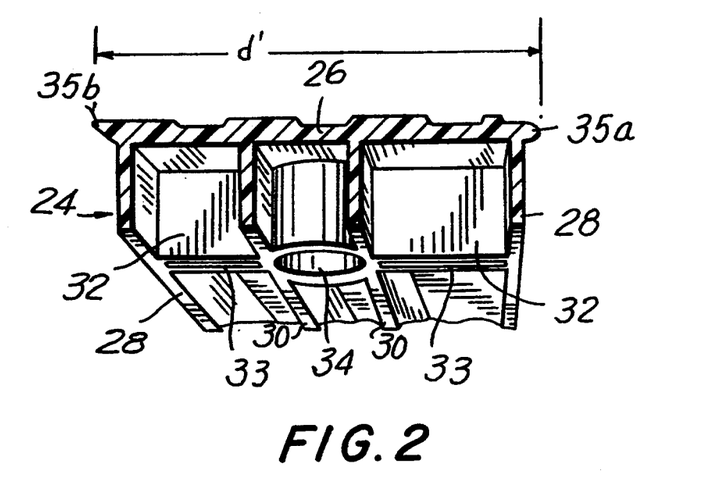
FIG. 2 is a fragmentary perspective view of a rigidizing member for use in the present invention as viewed from its underside.

As seen in FIG. 2, each rigidizing member 24 comprises a channel-shaped member formed of a suitable high impact plastic material, preferably high impact polystyrene. The channel-shaped rigidizing member 24 has a web portion 26, having a transverse dimension d' flanges 28, and a pair of inner stiffening ribs 30 that extend longitudinally along the underside of the web portion 26. Pairs of stiffening ribs 32 extend transversely between flanges 28 at spaced locations at the underside of the web portion. The transverse ribs 32 form slots 33 between each flange 28 and the adjacent stiffening rib 30, and a cylindrical receptacle 34 between the stiffening ribs 30 themselves. An outwardly projecting lip 35 extends around the periphery of web portion 26. The lip has a bull-nose cross-section along the longitudinal front edge 35a of web portion 26 and a tapered cross-section along the rear and side edges 35b thereof.

Figure 3A:
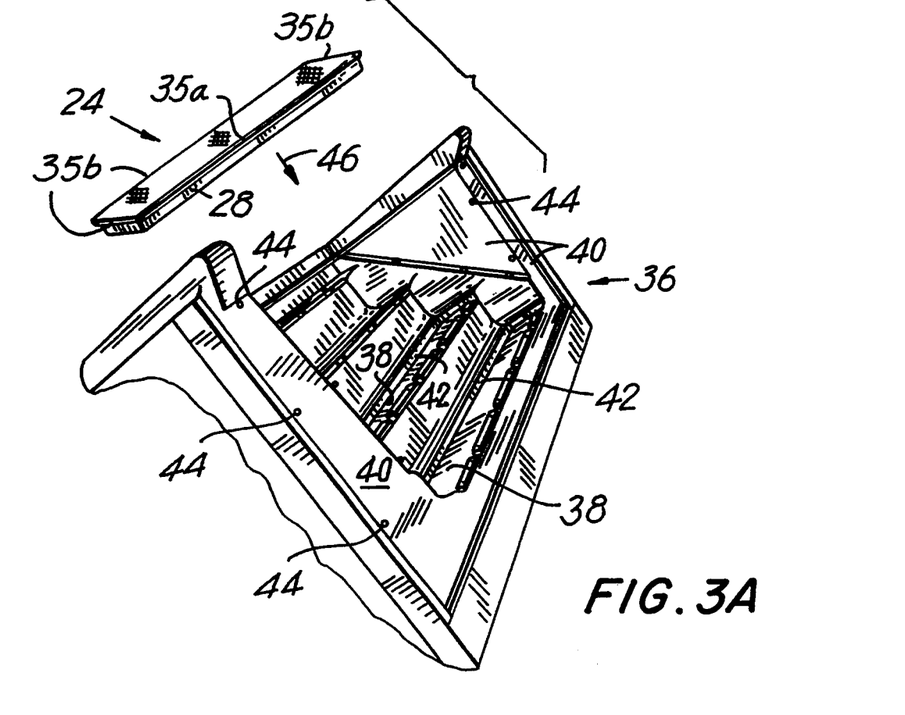
FIG. 3A is a schematic perspective view of a vacuum form mold for use in the manufacture of a unitary stair module in accordance with the invention, and illustrating the insertion of a rigidizing member into a mold recess.

The construction of the stair module 16 will be described in conjunction with a description of its method of manufacture. Referring to FIG. 3A, a vacuum form mold 36 is shown which is used in the manufacture of the stair module 16. The mold 36 is formed of conventional metallic material and is shaped essentially in the form of the stair module, including step-forming surfaces 38 and side-forming surfaces 40. Vacuum ports 44 open onto the side and step-forming surfaces of mold 36 which communicate with a suitable source of suction (not shown). Each of the stair-forming surfaces 38 of mold 36 is formed with an elongated shallow recess 42 in the region of a step tread for receiving a corresponding one of the rigidizing members 24 as described below. Vacuum ports 44 open into each recess 42.

As a first step in the manufacture of stair module 16, rigidizing members 24 are inserted into respective ones of the mold recesses 42 as schematically illustrated by the arrow 46 in FIG. 3A. In the illustrated embodiment, four rigidizing members 24 are inserted into the four mold recesses 42 so that the mold appears as shown in FIG. 3B, whereby the transverse dimension d' of the rigidizing member 24 is substantially coextensive with the transverse dimension d of the recesses 42 defining the step treads.

Figure 3B:
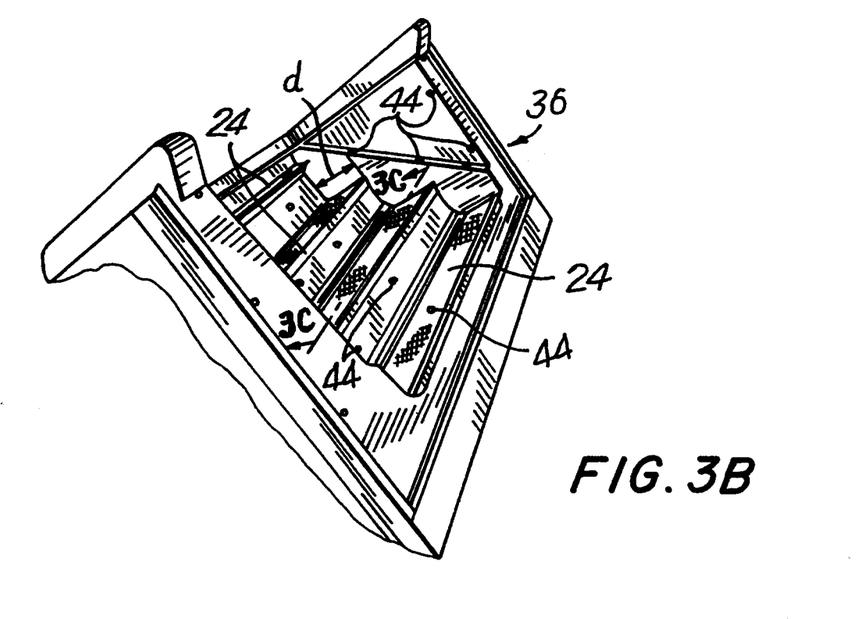
FIG. 3B is a view similar to FIG. 3A showing all of the rigidizing members inserted in respective mold recesses.
Figure 3C:
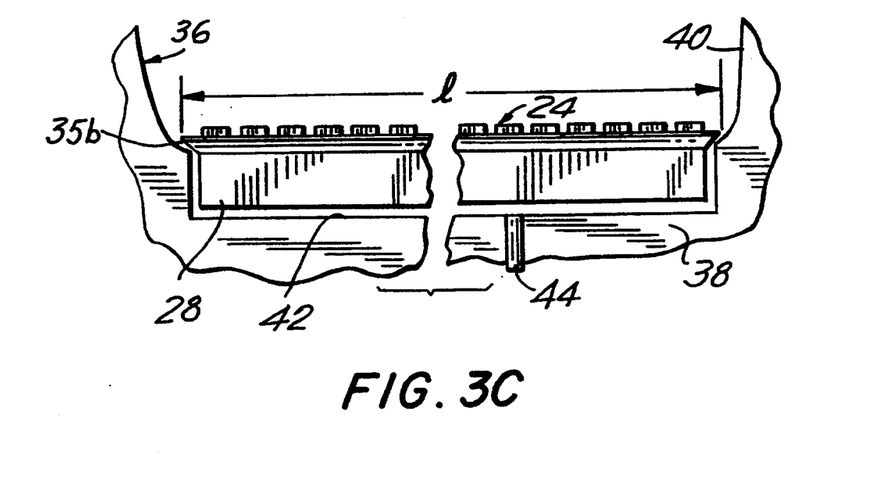
FIG. 3C is a fragmentary front elevation view of the vacuum form mold on an enlarged scale showing a rigidizing member inserted in a mold cavity.

As seen in FIG. 3C which is a view taken along the line 3–3 of FIG. 3B rotated clockwise until the rigidizing member 24 is situated in a horizontal plane, each rigidizing member 24 extends along a longitudinal dimension l and fits relatively loosely within a respective recess 42, so that a small clearance space, e.g. about 1/16 inch wide (shown exaggerated in FIG. 3C), exists between the rigidizing member 24 and the walls defining the recess 42. As discussed below, when the rigidizing member is inserted in the mold recess, the undercut surfaces of the peripheral lip 35 of web portion 26 are situated outwardly of recess 42 and are spaced from the surfaces 40 of mold 36.

Figure 4:
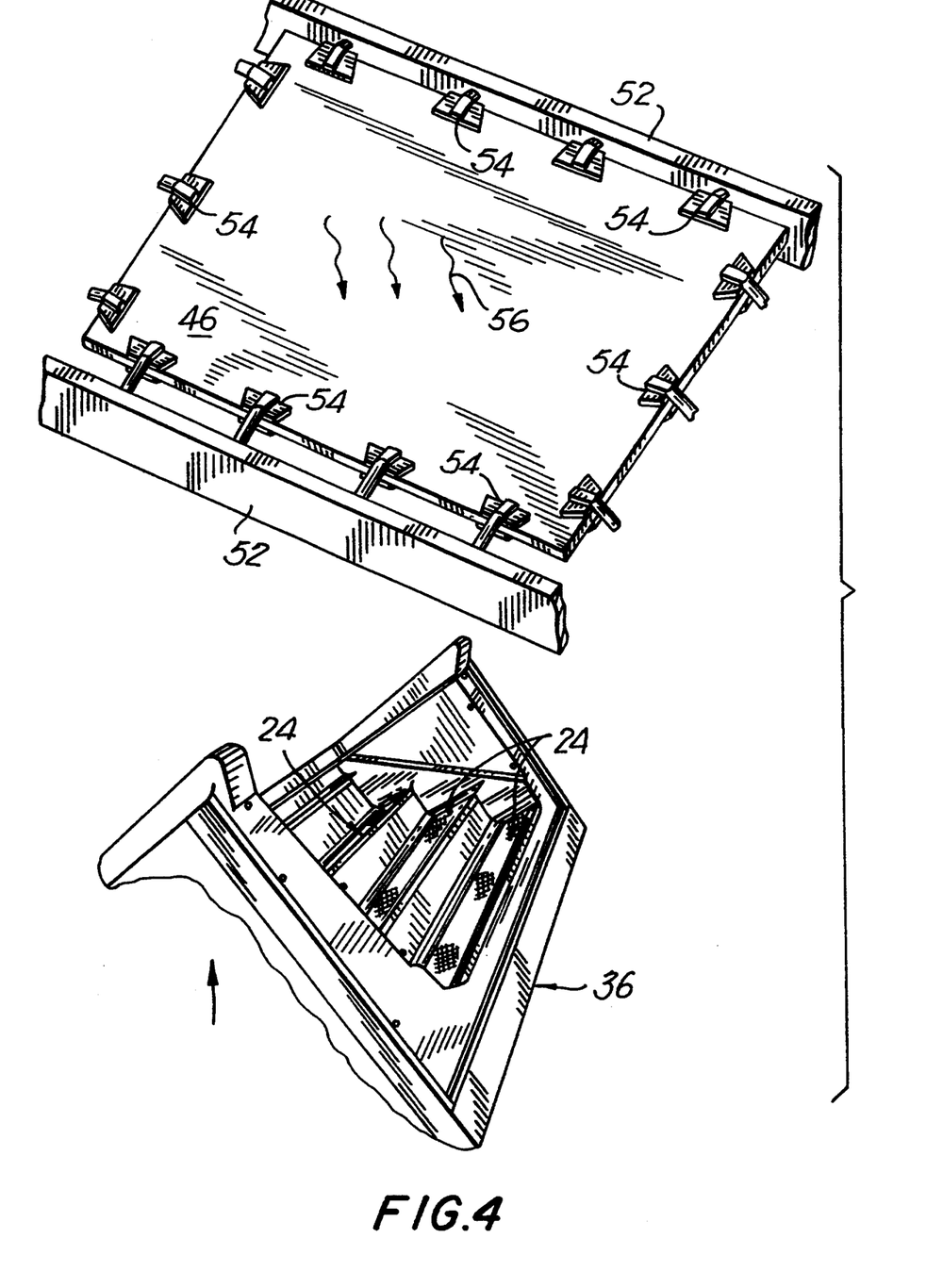
FIG. 4 is a schematic perspective view of the vacuum form mold and inserted rigidizing members together with a piece of plastic sheet material mounted over the mold.
Figure 5:
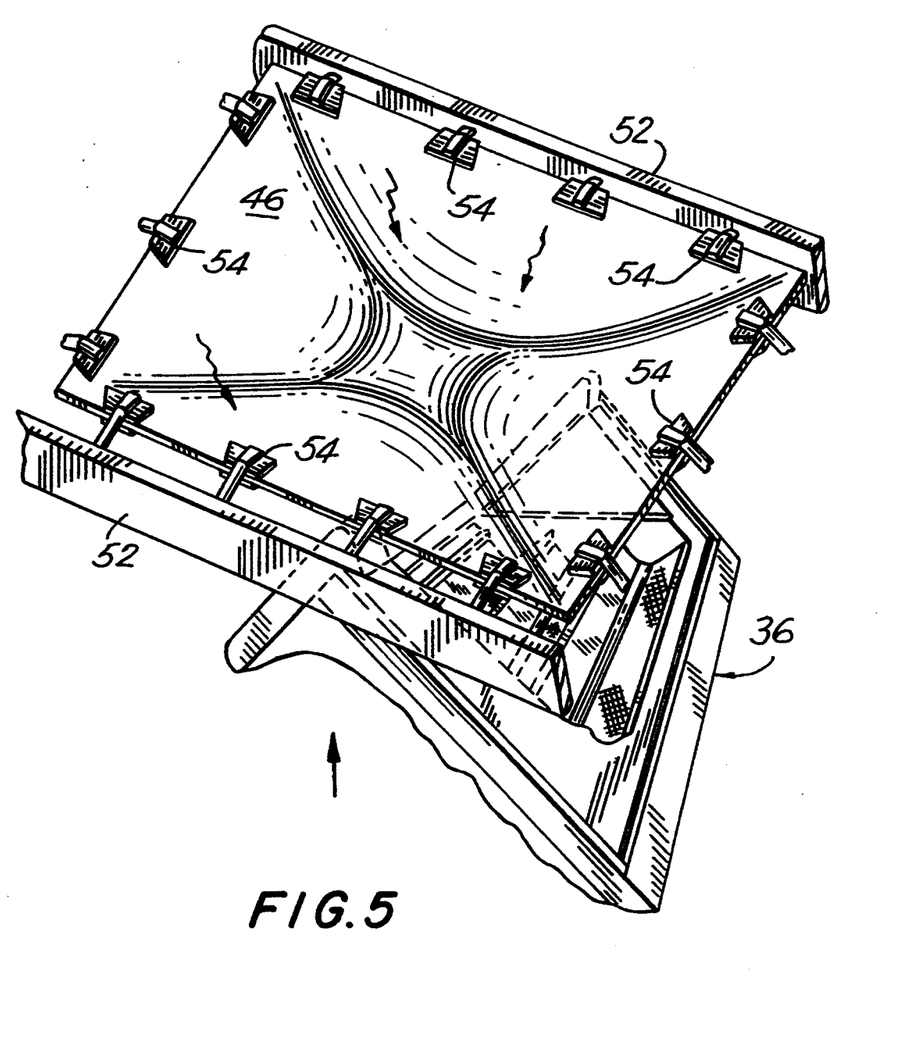
FIG. 5 is a view similar to FIG. 4 illustrating the piece of plastic sheet material after heat treatment and as the vacuum form mold is raised into contact therewith.

Referring now to FIG. 4, a single piece of plastic sheet 46 is held in a clamp frame 48 comprising pairs of opposed beams 52 from which a series of clamps 54 extend that hold respective sides of the plastic sheet 46. The plastic sheet 46 held in frame 48 is positioned over the mold as illustrated in FIG. 4, whereupon it is heated by ovens containing resistance heating rods, designated by reference numeral 56, positioned above and below sheet 46. The heating of the plastic sheet causes the plastic to soften and sag under its own weight as seen in FIG. 5. Once the sheet has reached sufficient temperature the ovens, containing the heating rods, are withdrawn, whereupon the mold begins to be raised towards the clamp frame 48. At the same time the vacuum source is activated so that suction is drawn through vacuum ports 44 of vacuum form mold 36. As the mold 36 ascends, the softened sheet 46 of plastic material is draped onto the step and side forming surfaces 38, 40 of mold 36 and conforms to their shape under the force of the underpressure drawn through vacuum ports 44 to form the stair shell 22.

Figure 6:
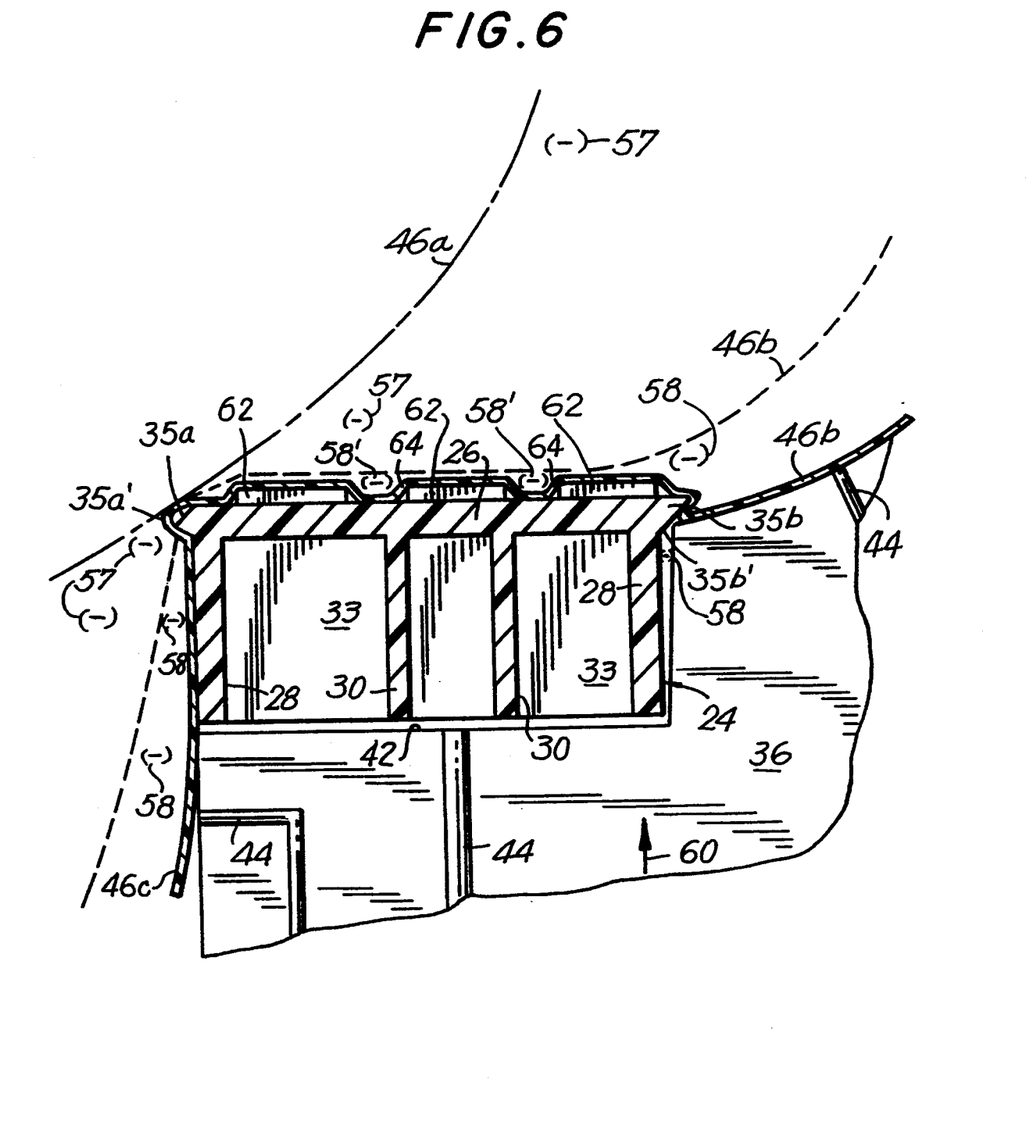
FIG. 6 is a fragmentary side elevation view in section of the vacuum form mold and a rigidizing member inserted therein as the mold is raised to engage the piece of plastic sheet material showing the stages of encapsulation.

In accordance with the invention, during the molding process the rigidizing members are at least partially encapsulated in, or molded into, the plastic sheet. Referring to FIG. 6, as the mold ascends, designated by arrow 60, the front edge 35a of peripheral lip 35 initially engages the plastic sheet situated in the position designated 46a. The vacuum drawn through ports 44 causes an underpressure to exist in the regions designated 57. As the mold 36 continues to rise, the plastic sheet assumes the relative position designated 46b under the forces of gravity and the underpressure 57 at regions. In this position, the plastic sheet 46b has engaged the undercut surface 35a ' of the forward edge 35a of the peripheral lip 35 of the web portion 26 of rigidizing member 24. Meanwhile, the vacuum drawn through ports 44 causes an underpressure to exist in the regions designated 58. When the mold 36 reaches its uppermost position, the plastic sheet finally assumes the relative position designated 46c under the forces of gravity and the underpressure 58. In this position, the plastic sheet 46c has engaged the undercut surface 35b' of the rear and side edges 35b of the peripheral lip 35 of web portion 26.

Figure 8:
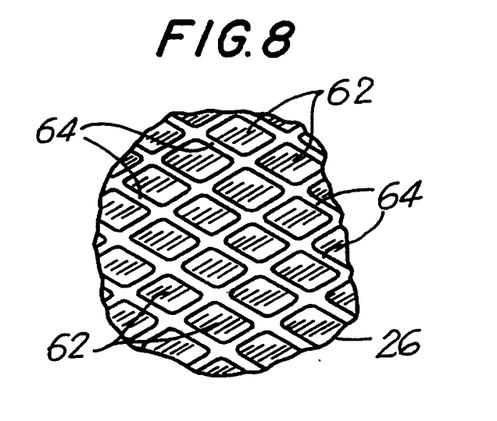
FIG. 8 is a top plan view of a rigidizing member in accordance with the invention.
Figure 9:
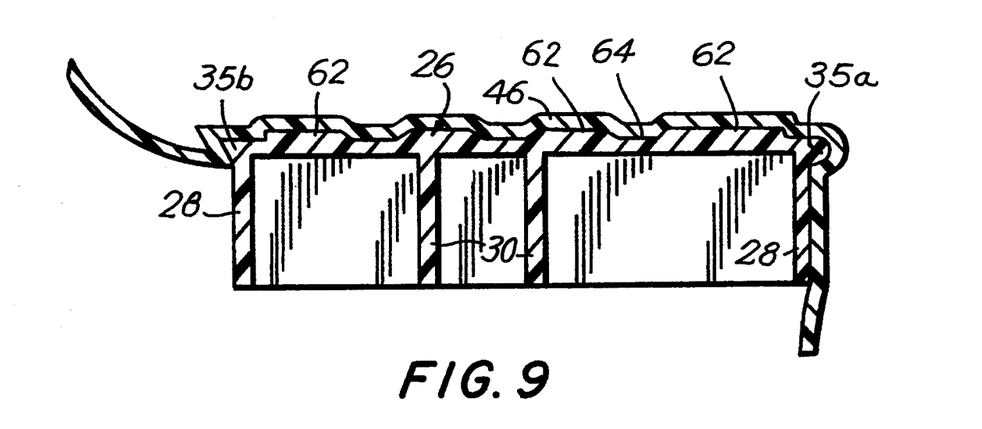
FIG. 9 is an enlarged side elevation section view of a step of the unitary stair module constructed in accordance with the invention.

According to another aspect of the invention, as seen in FIG. 8, the substantially planar upper surface of the web portion 26 of each rigidizing member 24 has a pattern of raised diamond-shaped ridges 62. These ridges 62 define channels 64 between them, and during the vacuum forming process, these channels 64 communicate with underpressure regions and are themselves at an underpressure, designated 58' in FIG. 6. The sheet plastic material 46b (FIG. 6) overlying the upper surfaces of the web portion 26 of the rigidizing member 24 will be drawn into the channels 64 and follow the contour of the pattern of ridges and channels as seen in FIG. 9 under the force of the underpressure to define a non-slip surface for each stair tread 18a.

Referring now to FIG. 7, the support means 20 for supporting the stair module 16 includes three spaced unitary support braces 66 (only one shown) formed of thermoplastic material. The braces 66 are situated beneath the stair module 16, two at the longitudinal ends of the steps 18 and one centrally to provide maximum support. Each support brace 66 includes a base 68, structural member 70, and a plurality of horizontal step support members 72. Each of the support members 72 of each brace 66 engages the lower edge of at least one of the flanges 28 and the pair of stiffening ribs 30 of a respective rigidizing member 24 to support the corresponding step tread 18a. In the illustrated embodiment, a pair of tabs 74 extend vertically from each of the support members 72 and the braces are positioned so that the tabs on the particular support member 72 are received within one of the slots 33 and receptacle 34 formed by the transverse stiffening ribs 30 to thereby positively couple the support braces 66 to the rigidizing member 24 and prevent relative movement between the braces and stair module 16. The support means of the invention is easy to install and provides maximum strength and durability.

Still referring to FIG. 7, a deck bracing grid 76 comprising a base 78, structural members 80, and a deck support member 82 is connected to support brace 66 by means of threaded fasteners 84. A stake 86 is movably mounted in an integral guide sleeve 88 for secure positioning of the assembly. Bracing grid 76 may be connected to each of the support braces 66 so that the deck support members 82 thereof can provide support for a deck, shown in phantom at 90.

The step system of the present invention eliminates the need for conventional columnar piping supports and provides a unitary stair module that is a sturdy, one-piece unit that will not delaminate, splinter, corrode or puncture. The strength and flexibility provided by the plastic materials of which the step system is formed withstands the stresses of frost and backfill. The step treads of the stair module provide minimal flex under load, and there is no danger of the rigidizing member separating from the stair shell.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. A step system for a structure, comprising:
   a unitary stair module defining a plurality of longitudinal steps, including a stair shell formed of plastic sheet material defining a plurality of step treads, and a plurality of elongated rigidizing members having a substantially planar upper surface substantially coextensive with a transverse dimension of said step tread, said plastic sheet material partially encapsulating each of said rigidizing members such that said plastic sheet material follows said upper surface substantially across the entire transverse dimension of said step tread, and
   support means for supporting said stair module at an underside of said steps in a fixed position relative to the structure.

2. The step system of claim 1, wherein said rigidizing members extend substantially coextensively with said step treads.

3. A step system as recited in claim 1 wherein each of said rigidizing members comprises a channel member having a web portion having a transverse dimension substantially coextensive with the transverse dimension of a step tread.

4. A step system as recited in claim 3 wherein said web portion is encapsulated within said plastic sheet material of a respective one of said stair treads.

5. A step system as recited in claim 3 wherein said web of each of said rigidizing members has a pattern of alternating ridges and valleys, and wherein said plastic sheet material of a corresponding step tread follows said pattern of ridges and valleys to define a non-slip surface for said step tread.

6. A step system as recited in claim 1 wherein each of said rigidizing members comprises a channel member having a web portion, and wherein said web portion is encapsulated within said plastic sheet material of a respective one of said step treads.

7. A step system as recited in claim 6 wherein said web portion has a transverse dimension which is substantially coextensive with the transverse dimension of said step tread.

8. A step system as recited in claim 6 wherein said web portion of each of said rigidizing members includes undercut surfaces, and wherein said undercut surfaces of said web portion are encapsulated in said plastic sheet material of a respective one of said step treads.

9. A step system as recited in claim 8 wherein said undercut surfaces extend along peripheral edge regions of said web of each of said rigidizing members.

10. A step system as recited in claim 1 wherein said support means include at least two unitary support braces situated beneath said stair module and at longitudinal ends of said steps, each support brace including a base and a plurality of step support members, each step support member engaging and supporting an underside of a respective step of said stair module.

11. A step system as recited in claim 10 further including deck supporting means removably connected to each of said support braces.

12. A step system as recited in claim 10 wherein each step support member of each brace engages a respective one of said rigidizing members.

13. A step system as recited in claim 12 wherein each rigidizing member comprises a channel member having a web portion and at least a pair of flange portions, and wherein each of said step support members of each brace engages at least one of said flange portions of a respective one of said rigidizing members.

14. A step system as recited in claim 12 further including means for coupling said step support members of each brace to a respective one of said rigidizing members.

15. A unitary stair module defining a plurality of longitudinal steps, comprising
a stair shell formed of plastic sheet material defining a plurality of step treads, and
a plurality of elongated rigidizing members having a substantially planar upper surface substantially coextensive with a transverse dimension of said step tread, said plastic sheet material partially encapsulating each of said rigidizing members to define said plurality of longitudinal steps such that said plastic sheet material follows said upper surface substantially across the entire transverse dimension of said step tread.

16. The unitary stair module of claim 15, wherein said rigidizing members extend substantially coextensively with said step treads.

17. A stair module as recited in claim 15 wherein each of said rigidizing members comprises a channel member having a web portion having a transverse dimension which is substantially coextensive with the transverse dimension of a step tread.

18. A stair module as recited in claim 17 wherein said web portion is encapsulated within said plastic sheet material of a respective one of said step treads.

19. A stair module as recited in claim 17 wherein said web of each of said rigidizing members has a pattern of alternating ridges and valleys, and wherein said plastic sheet material of a corresponding step tread follows said pattern of ridges and valleys to define a non-slip surface for said step tread.

20. A stair module as recited in claim 15 wherein each of said rigidizing members comprises a channel member having a web portion, and wherein said web portion is encapsulated within said plastic sheet material of a respective one of said step treads.

21. A stair module as recited in claim 20 wherein each web portion has a transverse dimension which is substantially coextensive with the transverse dimension of said step tread.

22. A stair module as recited in claim 20 wherein said web portion of each of said rigidizing members includes undercut surfaces, and wherein said undercut surfaces of said web portion are encapsulated in said plastic sheet material of a respective one of said step treads.

23. A stair module as recited in claim 22 wherein said undercut surfaces extend along peripheral edge regions of said web of each of said rigidizing members.

24. A step system for a structure, comprising:
a unitary stair module defining a plurality of longitudinal steps, including a stair shell formed of plastic sheet material defining a plurality of step treads, and a plurality of elongated rigidizing members, each rigidizing member being partially encapsulated within said plastic sheet material of a respective one of said step treads, and extending substantially coextensively therewith; and
support means for supporting said stair module at an underside of said steps in a fixed position relative to the structure,
each of said rigidizing members comprising a channel member having a web portion having a transverse dimension substantially coextensive with the transverse dimension of a step tread, said web of each of said rigidizing members having a pattern of alternating ridges and valleys, and said plastic sheet material of a corresponding step tread following said pattern of ridges and valleys to define a non-slip surface for said step tread.

25. A unitary stair module defining a plurality of longitudinal steps, comprising a stair shell formed of plastic sheet material defining a plurality of step treads, and a plurality of elongated rigidizing members, each rigidizing member being partially encapsulated within said plastic sheet material of a respective one of said step treads and extending substantially coextensive therewith to define said plurality of longitudinal steps,
each of said rigidizing members comprising a channel member having a web portion having a transverse dimension which is substantially coextensive with the transverse dimension of a step tread, said web of each of said rigidizing members having a pattern of alternating ridges and valleys, and said plastic sheet material of a corresponding step tread follows said pattern of ridges and valleys to define a non-slip surface for said step tread.

* * * * *